US011361542B2

(12) United States Patent
Knight et al.

(10) Patent No.: US 11,361,542 B2
(45) Date of Patent: *Jun. 14, 2022

(54) AUGMENTED REALITY APPARATUS AND METHOD

(71) Applicant: 2MEE LTD, York (GB)

(72) Inventors: Christopher George Knight, York (GB); James Patrick Riley, York (GB)

(73) Assignee: 2MEE LTD, York (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,891

(22) Filed: Dec. 10, 2020

(65) Prior Publication Data

US 2021/0166030 A1    Jun. 3, 2021

Related U.S. Application Data

(63) Continuation of application No. 14/427,672, filed as application No. PCT/GB2013/052382 on Sep. 12, 2013, now Pat. No. 10,885,333.

(30) Foreign Application Priority Data

Sep. 12, 2012 (GB) .................................... 1216210

(51) Int. Cl.
*G06V 20/20* (2022.01)
*H04N 5/232* (2006.01)
(Continued)

(52) U.S. Cl.
CPC ............ *G06V 20/20* (2022.01); *G06T 19/006* (2013.01); *H04N 1/32144* (2013.01);
(Continued)

(58) Field of Classification Search
None
See application file for complete search history.

(56) References Cited

U.S. PATENT DOCUMENTS 5,947,742 A    9/1999   Katayama
5,984,684 A    11/1999  Brostedt et al.
(Continued)

FOREIGN PATENT DOCUMENTS

EP    1349382 A2    10/2003
EP    2779633 A1    9/2014
(Continued)

OTHER PUBLICATIONS

Par2Pro: Swinguru at the PGA Expo 201 by Par2Pro, Aug. 22, 2013, XP054975880, Retrieved from internet: URL:https://www.youtube.com/watch?v=PmHSyDw0MQs, retrieved on Aug. 19, 2019, 1 page.

(Continued)

*Primary Examiner* — Frank S Chen
(74) *Attorney, Agent, or Firm* — Gesmer Updegrove LLP

(57) ABSTRACT

An augmented reality experience is provided to a user of a hand held device, such as a mobile phone, which incorporates an electronic processor, a camera and a display. Images taken from video footage are displayed in a display of a hand held device together with a live camera view, to create the illusion that the subject of the video—i.e., the virtual moving image—is present in the field of view of the camera in real time. In this context the term "real world" image means an image taken from reality, such as a physical, real-world scenario using an electronic photo-capture technique, e.g. video recording. A camera of a hand held device is aimed at a well-known object, which is recognisable to the device. A moving virtual image of an actor playing the part of an historical figure, chosen because of its relevance to the object, is displayed.

24 Claims, 14 Drawing Sheets

(51) Int. Cl.
*H04N 5/262* (2006.01)
*H04N 1/32* (2006.01)
*G06T 19/00* (2011.01)

(52) U.S. Cl.
CPC ....... *H04N 5/23293* (2013.01); *H04N 5/2621* (2013.01); *H04N 2201/3245* (2013.01); *H04N 2201/3273* (2013.01)

(56) References Cited

U.S. PATENT DOCUMENTS

| | | | |
|---|---|---|---|
| 10,679,413 | B2 | 6/2020 | Knight et al. |
| 2002/0115047 | A1 | 8/2002 | McNitt et al. |
| 2003/0108329 | A1 | 6/2003 | Adriansen et al. |
| 2005/0272517 | A1 | 12/2005 | Funk et al. |
| 2006/0038833 | A1 | 2/2006 | Mallinson et al. |
| 2006/0040755 | A1 | 2/2006 | Choi |
| 2006/0228689 | A1 | 10/2006 | Rajaram |
| 2007/0216675 | A1 | 9/2007 | Sun et al. |
| 2009/0319397 | A1 | 12/2009 | Joe et al. |
| 2010/0158109 | A1 | 6/2010 | Dahlby et al. |
| 2010/0309225 | A1 | 12/2010 | Gray et al. |
| 2011/0141254 | A1 | 6/2011 | Roebke et al. |
| 2011/0249073 | A1 | 10/2011 | Cranfill et al. |
| 2011/0275045 | A1 | 11/2011 | Bhupathi et al. |
| 2012/0200743 | A1 | 8/2012 | Blanchflower et al. |
| 2012/0206577 | A1 | 8/2012 | Guckenberger et al. |
| 2012/0250940 | A1 | 10/2012 | Kasahara |
| 2012/0274634 | A1* | 11/2012 | Yamada .................... G06T 7/50 345/419 |
| 2012/0327172 | A1 | 12/2012 | El-Saban et al. |
| 2013/0050395 | A1 | 2/2013 | Paoletti et al. |
| 2013/0083173 | A1 | 4/2013 | Geisner et al. |
| 2013/0135295 | A1 | 5/2013 | Li et al. |
| 2014/0002677 | A1 | 1/2014 | Schinker |
| 2014/0308640 | A1 | 10/2014 | Forman et al. |
| 2014/0327677 | A1 | 11/2014 | Walker |
| 2015/0091891 | A1 | 4/2015 | Raheman et al. |
| 2015/0195626 | A1 | 7/2015 | Lee et al. |

FOREIGN PATENT DOCUMENTS

| | | |
|---|---|---|
| GB | 2462780 A | 2/2010 |
| GB | 2467280 A | 2/2010 |
| GB | 2508070 A | 5/2014 |
| JP | 2012216077 A | 11/2012 |
| KR | 1020120122512 A | 11/2012 |
| WO | 02069272 A2 | 9/2002 |
| WO | 2011067469 A1 | 6/2011 |
| WO | 2012001218 A1 | 1/2012 |
| WO | 2012061804 A1 | 5/2012 |
| WO | 2012109182 A1 | 8/2012 |
| WO | 2014041352 A1 | 3/2014 |
| WO | 2015185110 A1 | 12/2015 |

OTHER PUBLICATIONS

Li et al., Video Object Cut and Paste, Jul. 31, 2005, ASM, ACM SIGGRAPH 2005 Papers, (Year: 2005), 6 pages.
Search Report and Examination Opinion issued by the European Intellectual Property Office dated Jul. 21, 2015 in related Great Britain Application No. GB1504754.1.
International Search Report and Written Opinion issued by the International Searching Authority dated Sep. 28, 2015 in related International Application No. PCT/GB2015/051697, 10 pages.
International Preliminary Report on Patentability issued by the International Bureau of WIPO dated Dec. 15, 2016 in related International Application No. PCT/GB2015/051697, 8 pages.
International Preliminary Report on Patentability issued by the International Bureau of WIPO dated Sep. 20, 2016 in related International Application No. PCT/GB2015/050832, 6 pages.
International Search Report and Written Opinion issued by the International Searching Authority dated Jun. 15, 2015 in related International Application No. PCT/GB2015/050832, 8 pages.
International Preliminary Report on Patentability issued by the International Bureau of WIPO dated Mar. 17, 2015 in related International Application No. PCT/GB2013/052382, 5 pages.
International Search Report and Written Opinion issued by the International Searching Authority dated Jan. 15, 2014 in related International Application No. PCT/GB2013/052382, 8 pages.
Breiteneder et al., "TELEPORT—An Augmented Reality Teleconferencing Environment," Feb. 1996, Virtual Environments and Scientific Visualization '96, Proceedings of the Eurographics Workshops in Monte Carlo, Monaco, Springer, Vienna, pp. 41-49, year: 1996.
Lee et al., "Real-time Background Subtraction for Video Avatar," International Journal of Future Computer and Communication, vol. 2, No. 1, Feb. 2013, pp. 41-43.
Wilson et al., "Facial Feature Detection Using HAAR Classifiers," JCSC 21, Apr. 4, 2006, CCSC: South Central Conference, pp. 127-133.
Lin et al., "Implementation of a Realtime Object-Based Virtual Meeting System," 2001 IEEE International Conference on Multimedia and Expo, ISBN 0-7695-1198-8/01, pp. 565-568.
Search Report issued by the European Intellectual Property Office dated Jul. 20, 2015 in related Great Britain Application No. GB1502854. 1.
Non-Final Office Action issued by the U.S. Patent and Trademark Office dated May 11, 2018, in related U.S. Appl. No. 15/127,554, 16 pages.
Final Office Action issued by the U.S. Patent and Trademark Office dated Feb. 19, 2019, in related U.S. Appl. No. 15/127,554, 20 pages.
Non-Final Office Action issued by the U.S. Patent and Trademark Office dated Sep. 6, 2019, in related U.S. Appl. No. 15/127,554, 15 pages.
Non-Final Office Action issued by the U.S. Patent and Trademark Office dated Dec. 12, 2017, in related U.S. Appl. No. 15/317,011, 21 pages.
Final Office Action issued by the U.S. Patent and Trademark Office dated Aug. 24, 2018 in related U.S. Appl. No. 15/317,011, 17 pages.
Non-Final Office Action issued by the U.S. Patent and Trademark Office dated Feb. 19, 2019, in related U.S. Appl. No. 15/317,011, 22 pages.
Final Office Action issued by the U.S. Patent and Trademark Office dated Oct. 4, 2019 in related U.S. Appl. No. 15/317,011, 20 pages.
Non-Final Office Action issued by the U.S. Patent and Trademark Office dated Aug. 23, 2017, in related U.S. Appl. No. 14/427,672, 20 pages.
Final Office Action issued by the U.S. Patent and Trademark Office dated Feb. 7, 2018, in related U.S. Appl. No. 14/427,672, 24 pages.
Final Office Action issued by the U.S. Patent and Trademark Office dated Jul. 25, 2018, in related U.S. Appl. No. 14/427,672, 25 pages.
Non-Final Office Action issued by the U.S. Patent and Trademark Office dated Jan. 28, 2019, in related U.S. Appl. No. 14/427,672, 31 pages.
Final Office Action issued by the U.S. Patent and Trademark Office dated Aug. 21, 2019, in related U.S. Appl. No. 14/427,672, 33 pages.
Non-Final Office Action issued by the U.S. Patent and Trademark Office dated Feb. 25, 2020, in related U.S. Appl. No. 14/427,672, 40 pages.
Non-Final Office Action issued by the U.S. Patent and Trademark Office dated Jan. 12, 2021, in related U.S. Appl. No. 16/860,397, 14 pages.
Non-Final Office Action issued by the U.S. Patent and Trademark Office in related U.S. Appl. No. 16/864,655 dated Jun. 23, 2021, 16 pages.

* cited by examiner

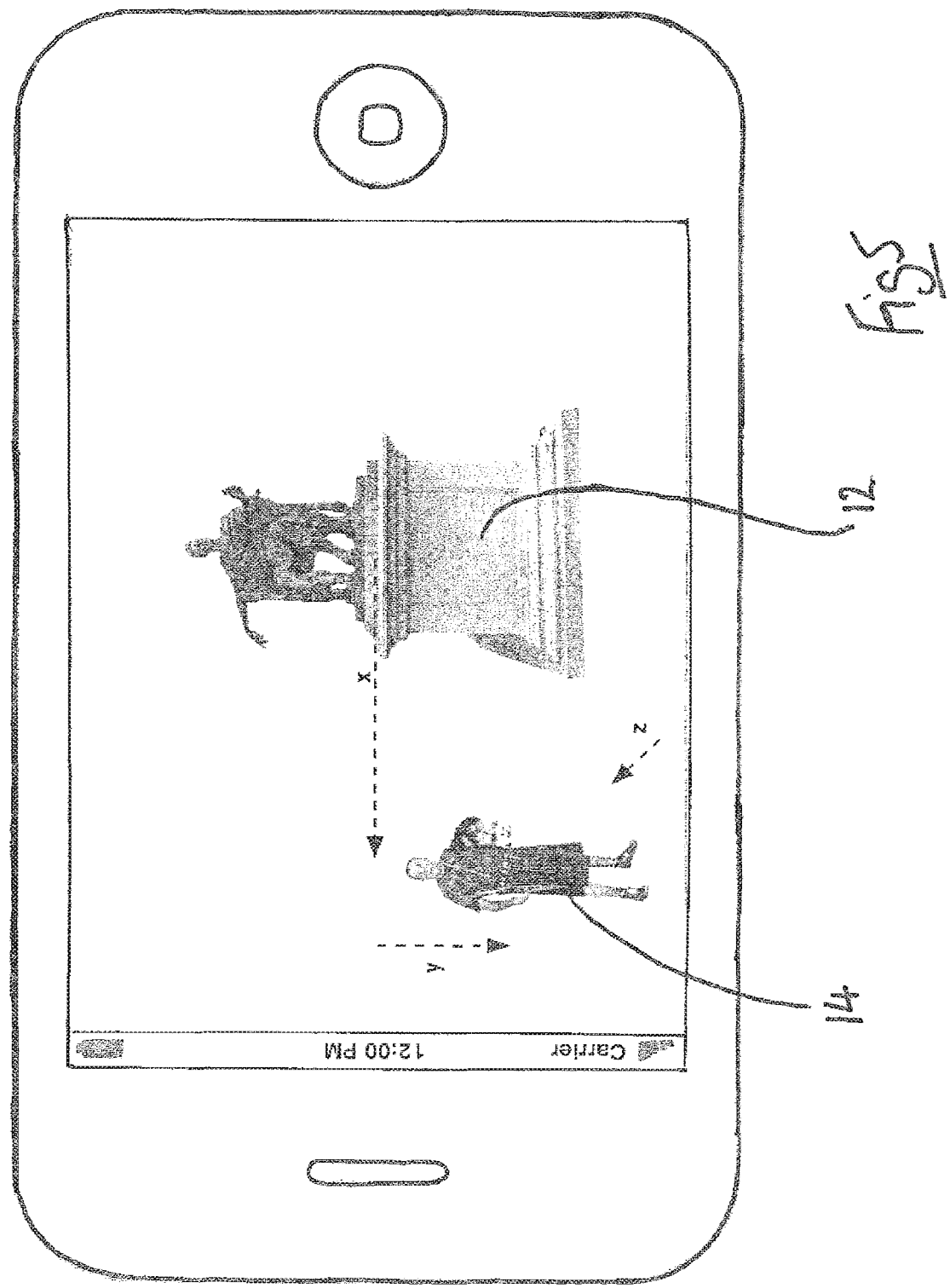

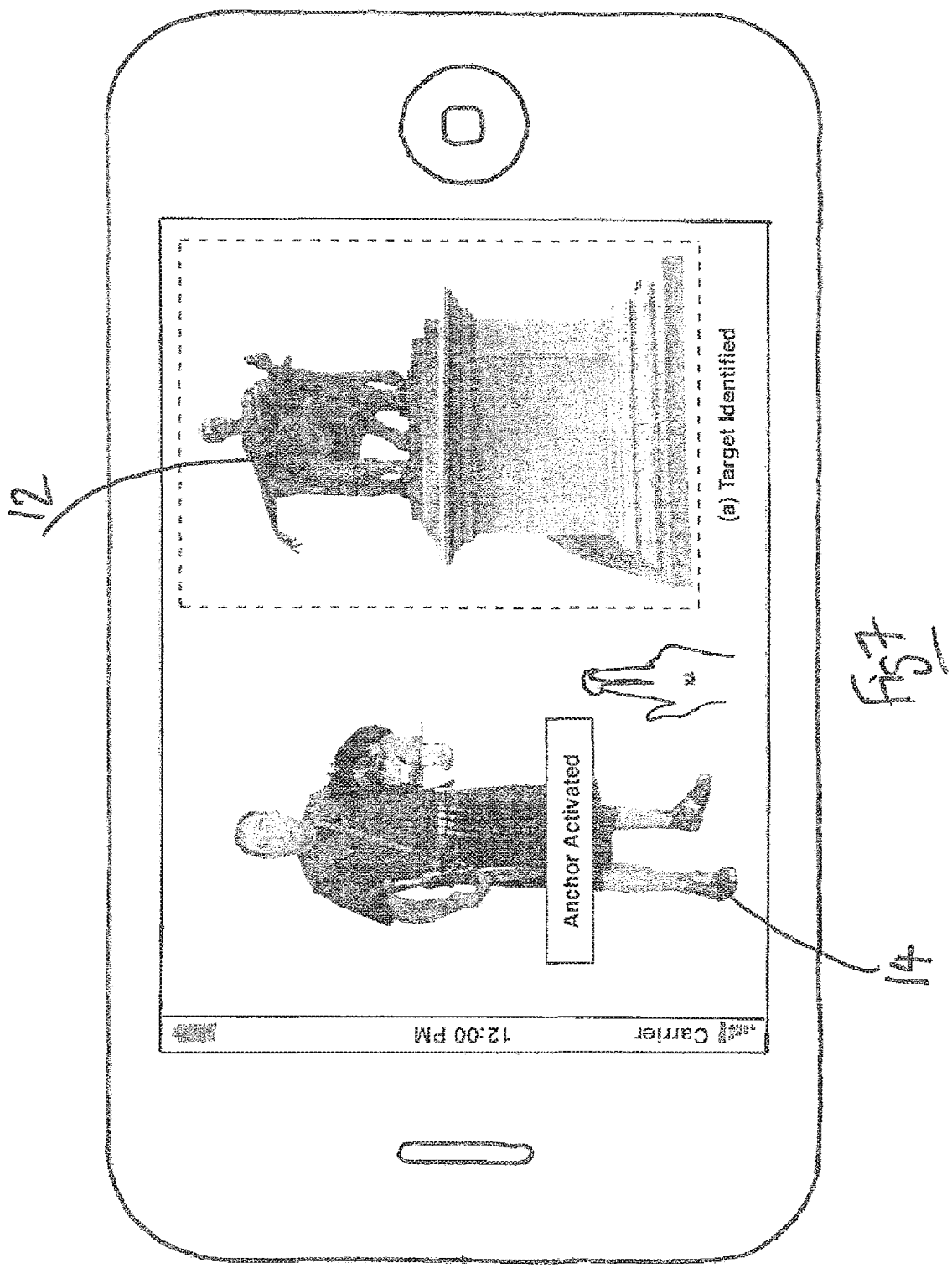

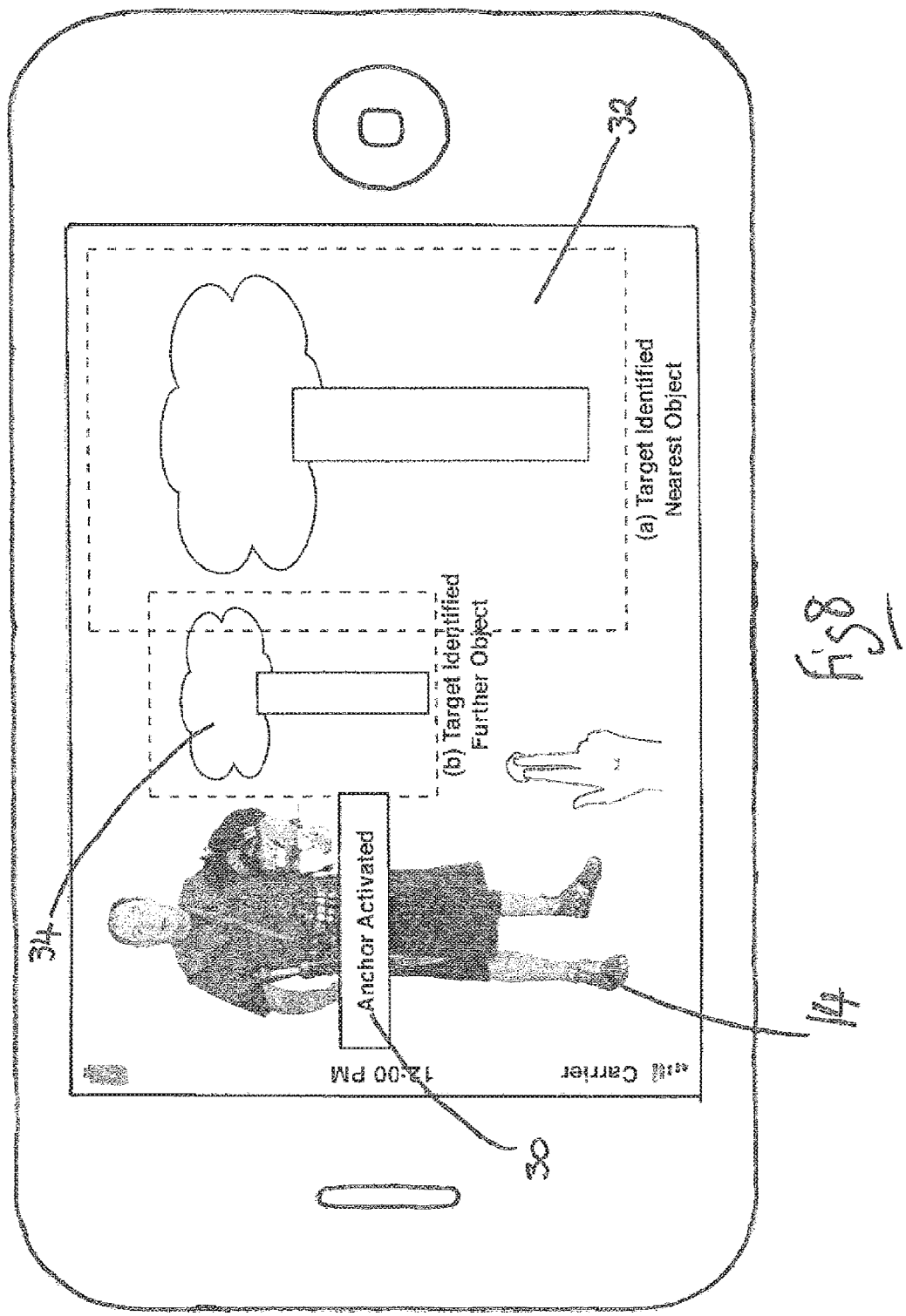

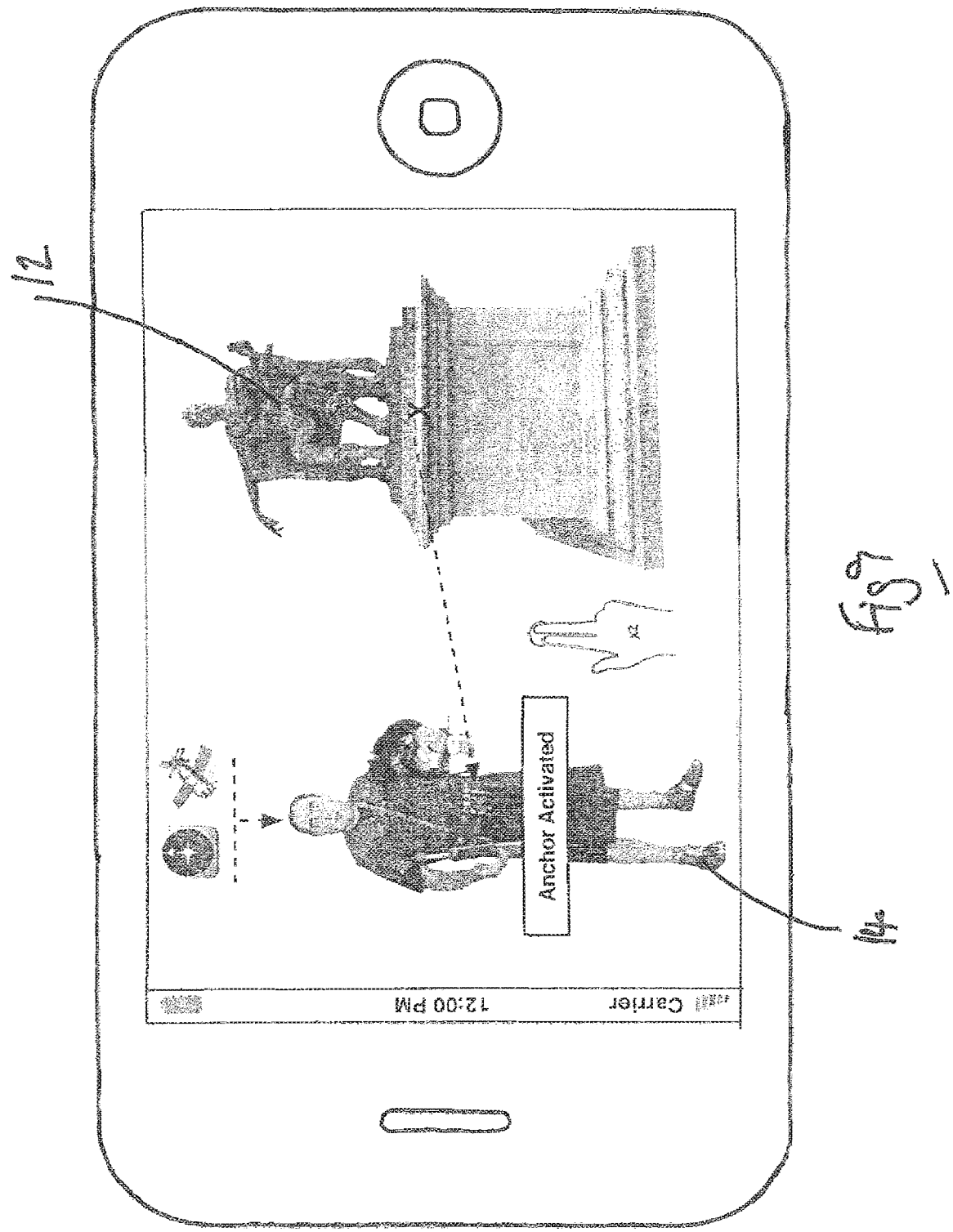

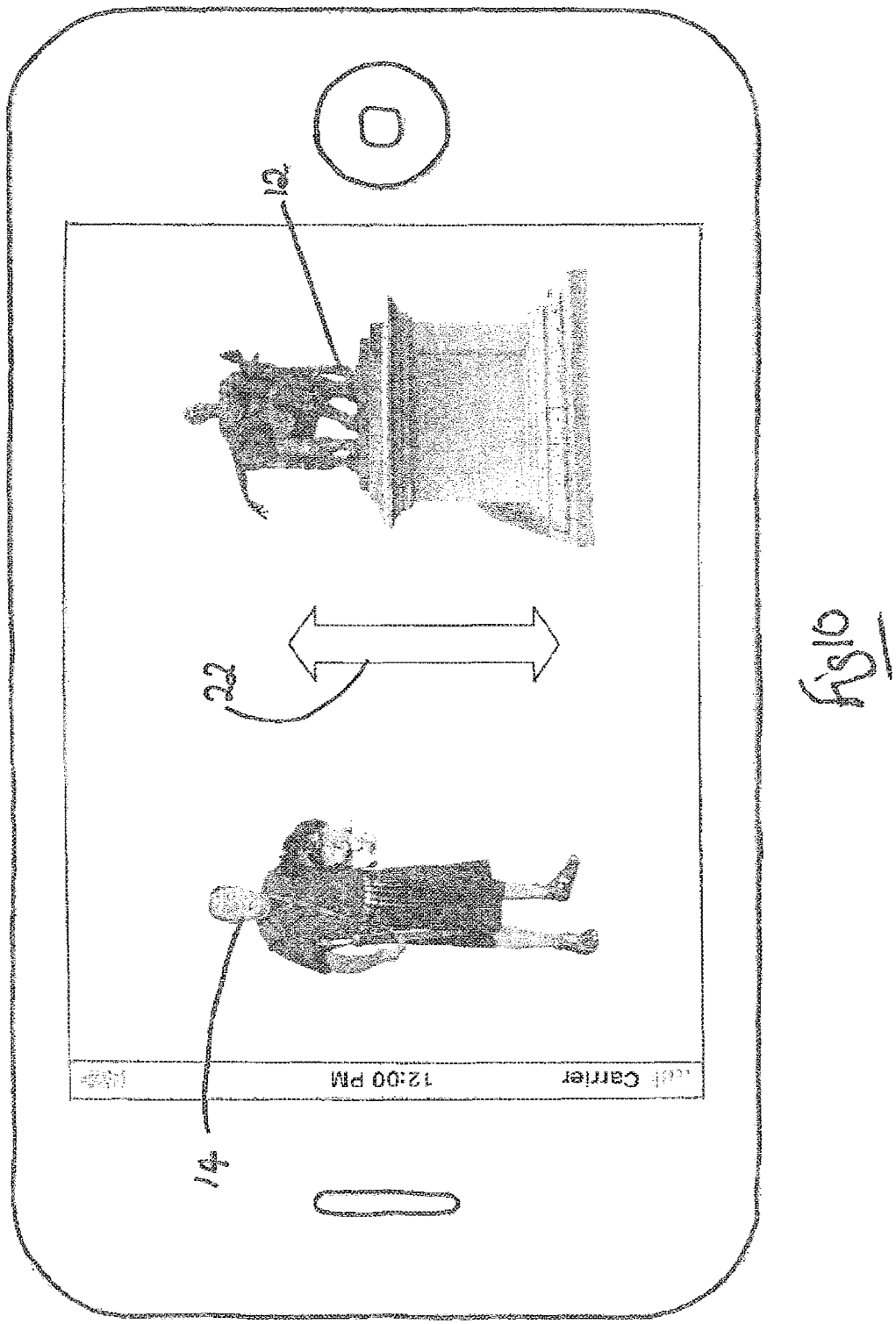

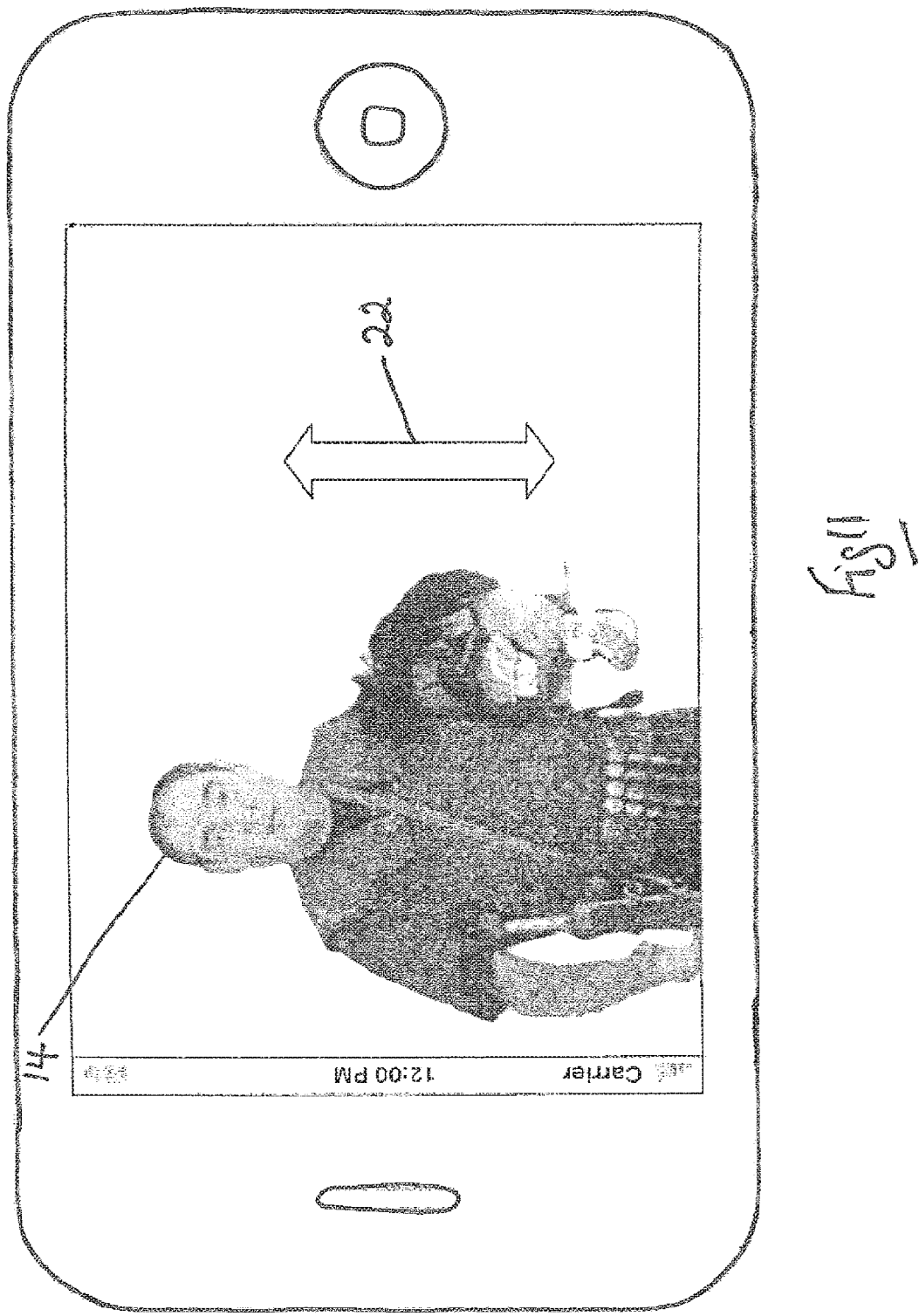

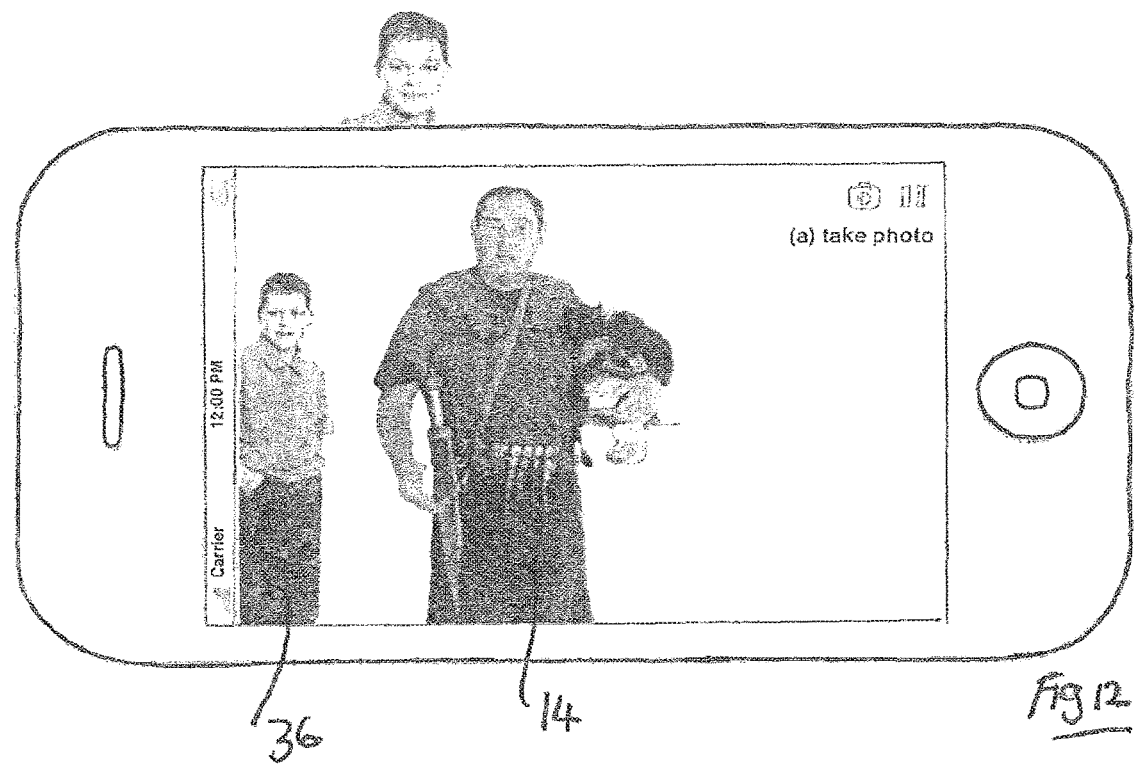
Fig 12
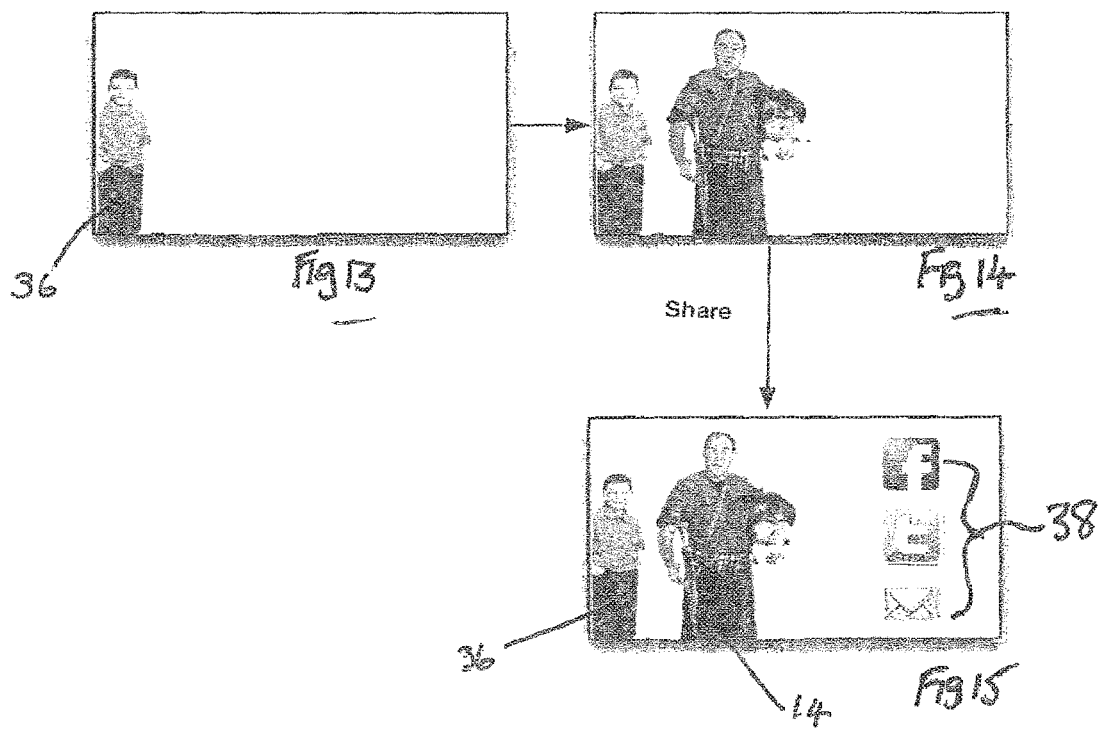
Fig 13
Fig 14
Share
Fig 15

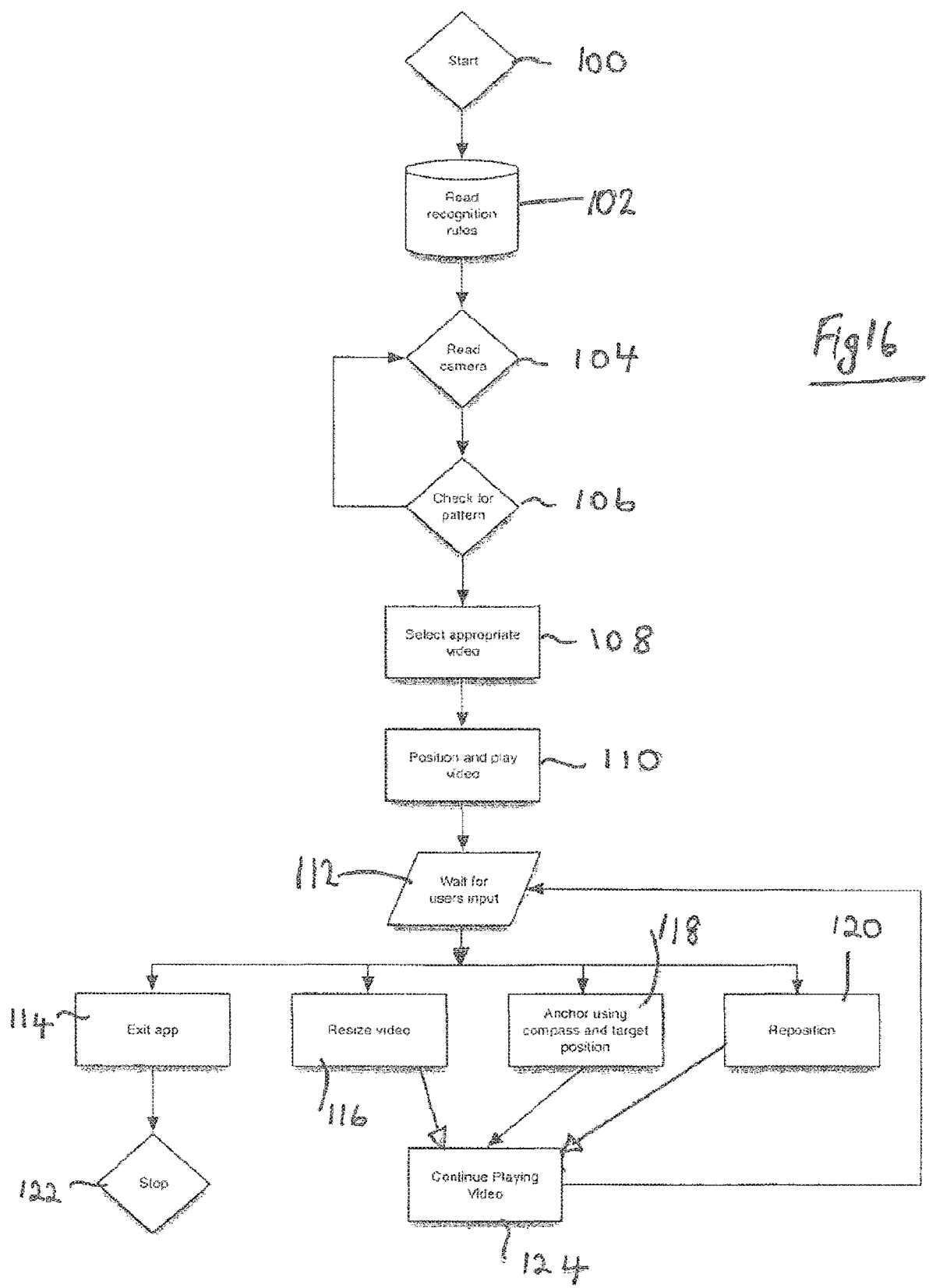

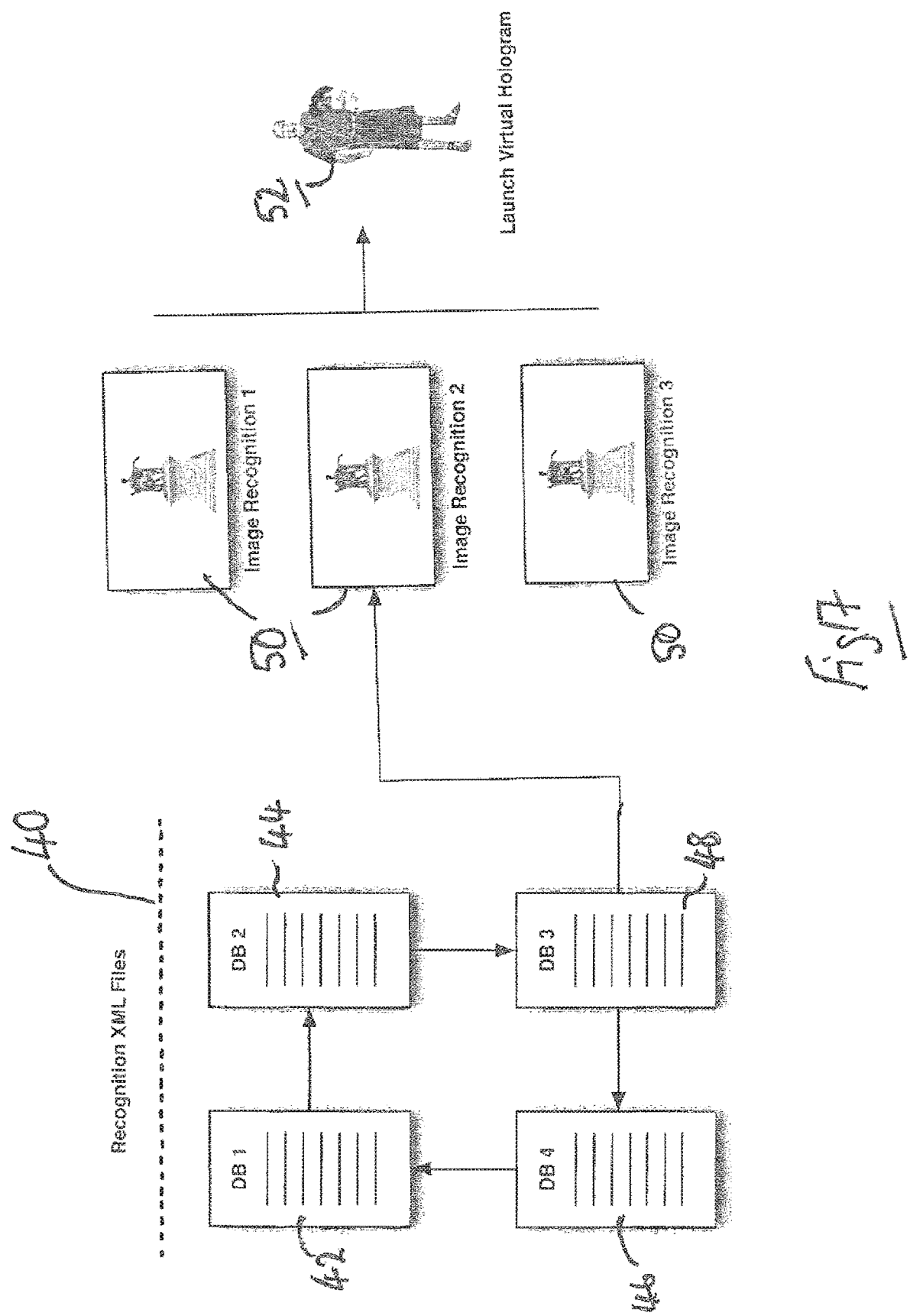

AUGMENTED REALITY APPARATUS AND METHOD

PRIORITY

The present application is a continuation of U.S. National Stage Entry application Ser. No. 14/427,672, filed Mar. 12, 2015, which claims priority to International Patent Application No. PCT/GB2013/052382, filed Sep. 12, 2013, which claims priority to United Kingdom (UK) Patent Application No. GB1216210.3, filed Sep. 12, 2012, the disclosures of which are herein incorporated by reference in their entireties.

The present invention relates to an apparatus and a method for providing an augmented reality experience, and is concerned particularly with an apparatus and a method for providing an augmented reality experience in a hand held device having a camera.

Augmented reality, in which the viewing of a real world environment is enhanced using computer generated input, is becoming available on various platforms, including television, head up displays, and to a limited extent, hand held devices such as cell phones.

The use of hand held devices, such as cell phones, as cameras has been enhanced by the availability of small, specialised downloadable programs, known informally as apps. Many of these include computer generated visual effects that can be combined with a "live view" through the camera, to provide the user with a degree of augmented reality for an improved image or amusement. However the incorporation of video footage into the live view of a camera has proved to be difficult due to the limited processing power available in most hand held devices, and the lack of a functional codebase provided with the built-in frameworks.

Embodiments of the present invention aim to provide apparatus and a method for incorporating an apparently moving image into a live camera view of a hand held device.

The present invention is defined in the attached independent claims to which reference should now be made. Further, preferred features may be found in the sub-claims appended thereto.

According to one aspect of the present invention there is provided apparatus for displaying an augmented reality on a display of a hand held device having a camera, the apparatus comprising a context identification unit for identifying a context from at least one real image captured by the device, a virtual image retrieval unit for selecting and displaying a virtual image in the display and a virtual image positioning unit for positioning the virtual image in the display, wherein the apparatus is arranged to display a virtual image comprising an electronically captured, moving real world image.

Preferably the virtual image is one that has been previously stored.

In a preferred arrangement the virtual image comprises a sequence of still images taken from a moving video.

Alternatively or additionally the virtual image may comprise a continuous moving video image.

The virtual image may comprise an image of a person or creature, or could be any other "real world" object or item.

In a preferred arrangement the context identification unit is arranged in use to identify a context by comparing at least one object in a field of view with stored data from a plurality of objects. The image retrieval unit is preferably arranged to select an image from a plurality of stored images according to context information determined by the context identification unit. The positioning unit is preferably arranged in use to position the virtual image according to context information determined by the context identification unit.

The positioning of the image by the positioning unit may include sizing of the image in the display, and may include anchoring the image in the display, with respect to context information determined by the context identification unit.

The context identification unit, and/or the virtual image retrieval unit, and/or the virtual image positioning unit may comprise processes arranged in use to be performed by one or more electronic processing devices.

The invention also includes a method of displaying an augmented reality on a display of a hand held device having a camera, the method comprising identifying a context from at least one real image captured by the device and selecting and positioning a virtual imago on the display, wherein the method comprises displaying a virtual image comprising an electronically captured, moving real world image.

Preferably the virtual image is one that has been previously stored.

In a preferred arrangement, the virtual image comprises a sequence of still images taken from a moving video.

In a preferred arrangement the method comprises identifying a context by comparing at least one object in the field of view with stored data from a plurality of objects. The method preferably comprises selecting an image from a plurality of stored images according to determined context information. The method also preferably comprises positioning the virtual image according to context information determined by the context identification unit.

The positioning of the image by the positioning unit may include si zing of the image in the display and may include anchoring the image in the display with respect to context information determined by the context identification unit.

The invention also comprises a program for causing a device to perform a method of displaying an augmented reality on a display of a hand held device having a camera, the method comprising identifying a context from at least one real image captured by the device and selecting and positioning a virtual image on the display, wherein the method comprises displaying a virtual image comprising an electronically captured, moving real world image.

The program may be contained within an app. The app may also contain data, such as virtual image data.

The virtual image may comprise a sequence of still images taken from a moving video.

The invention also comprises a computer program product, storing, carrying or transmitting thereon or therethrough a program for causing a device to perform a method of displaying an augmented reality on a display of a hand held device having a camera, the method comprising identifying a context from at least one real image captured by the device and selecting and positioning a virtual image on the display, wherein the method comprises displaying a virtual image comprising an electronically captured, moving real world image.

The virtual image may comprise a sequence of still images taken from a moving video.

The present invention may comprise any combination of the features or limitations referred to herein, except such a combination of features as are mutually exclusive.

Preferred embodiments of the present invention will now be described by way of example only with reference to the accompanying diagrammatic drawings in which:

FIGS. 3 and 3a show schematically an alternative first step in a context recognition process, in which there are multiple visible objects in the camera live view;

FIG. 6 shows schematically optional user controls for a virtual image, according to an embodiment of the present invention;

FIG. 7 shows a first step in an anchoring process for the image of FIG. 6;

FIG. 8 shows a further step in the anchoring process of FIG. 7;

FIG. 9 shows schematically an alternative anchoring process according to an embodiment of the present invention;

FIG. 10 shows schematically an automatic re-sizing process for a virtual image, in accordance with an embodiment of the present invention;

FIG. 11 shows schematically an automatic re-sizing process for a virtual image in an alternative scenario;

FIGS. 12-15 show schematically different steps in a process for taking a photograph incorporating both a real and a virtual image, according to an embodiment of the present invention;

FIG. 16 shows schematically a process for acquiring video footage incorporating both real and virtual images; and FIG. 17 is a schematic flow diagram showing some key steps in the process of displaying a virtual image in the live view of a camera, in accordance with an embodiment of the present invention.

The embodiment described below aims to provide an augmented reality experience to a user of a hand held device, such as a mobile phone, which incorporates an electronic processor, a camera and a display. In particular, images taken from video footage are displayed in a display of a hand held device together with a live camera view, to create the illusion that the subject of the video—ie the virtual moving image—is present in the field of view of the camera in real time.

In this context the term "real world" image means an image taken from reality, such as a physical, real-world scenario using an electronic photo-capture technique, e.g. video recording.

In order to achieve this the device must undertake various processes, including acquiring contextual information from the camera view, obtaining an appropriate virtual image, positioning the virtual image within the camera view, optionally anchoring the virtual image with respect to the context and optionally sizing the virtual image within the camera view.

The processes may be performed by an electronic processor of the hand held device.

The data necessary for the reconstruction of the virtual moving image, together with one or more programs for facilitating the necessary processes for manipulating it to provide the augmented reality experience, are downloadable to a hand held device in the form of a specialist program, or software application, known widely as an app. The app can preferably be updated to present the user with fresh viewing experiences.

The first example described in detail below is that of an augmented reality system for use as a guide at a visitor attraction, in which a virtual image of a figure is displayed within the real world camera view to provide information, via an associated audio file, about the attraction.

Figure 1:
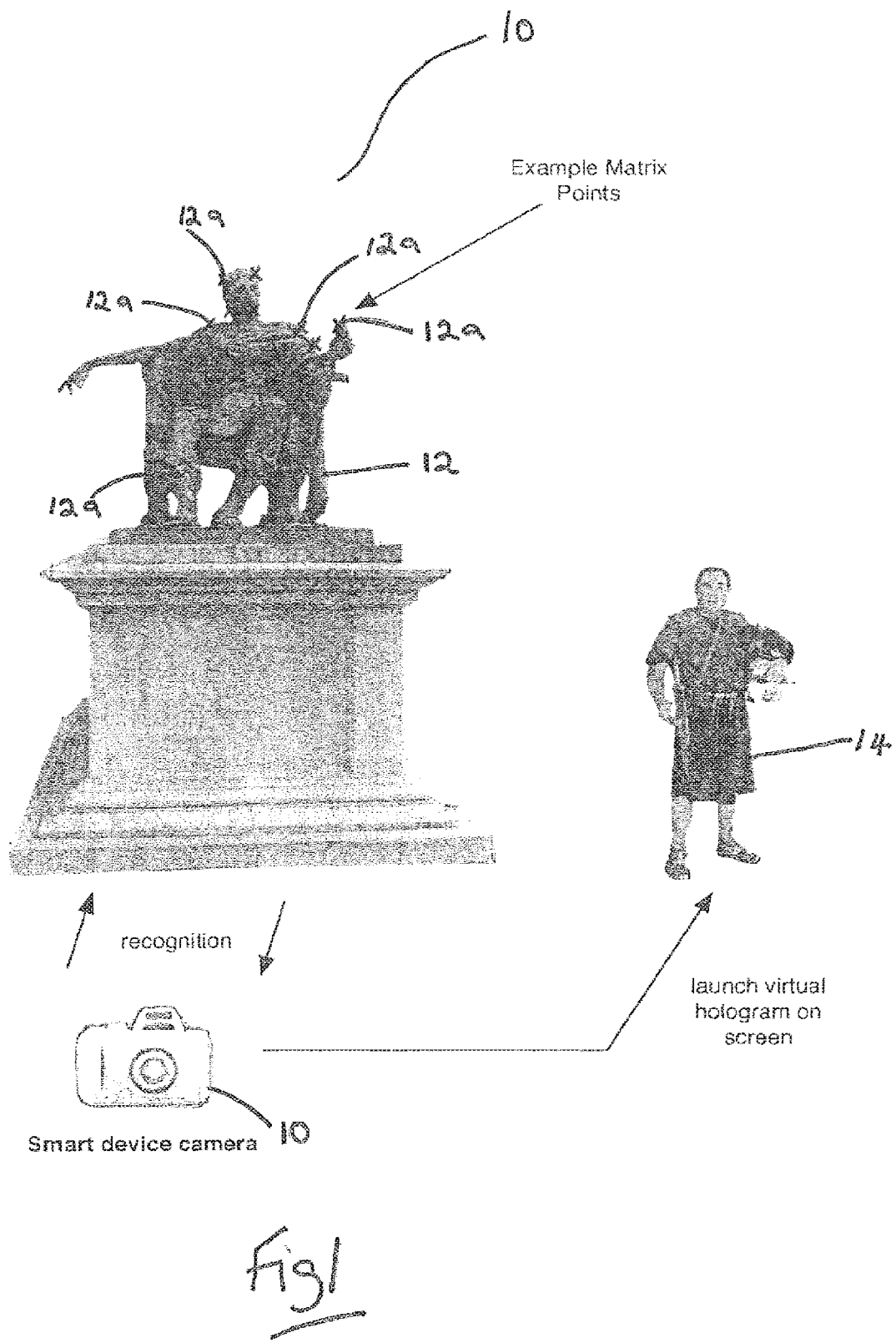
FIG. 1 shows a virtual image superimposed upon a camera view of a real image, in accordance with a preferred embodiment of the present invention.

Turning to FIG. 1, this shows schematically a camera 10 of a hand held device, in this case aimed at a well-known object 12, which is recognisable to the device, and a moving virtual image 14 of an actor playing the part of an historical figure that is chosen because of its relevance to the object 12. The device recognises the object, in this case a statue, based upon a unique set of matrix points 12a which have been stored in the downloaded app in an earlier stage, and which can provide the device with contextual information necessary for the subsequent selection, display and manipulation of the virtual image 14.

Moving virtual images 14 are stored in the device as sequences of still images taken from a video file, and synchronised with an appropriate audio file, when the app is downloaded and the appropriate one is chosen after the context has been determined.

Figure 2:
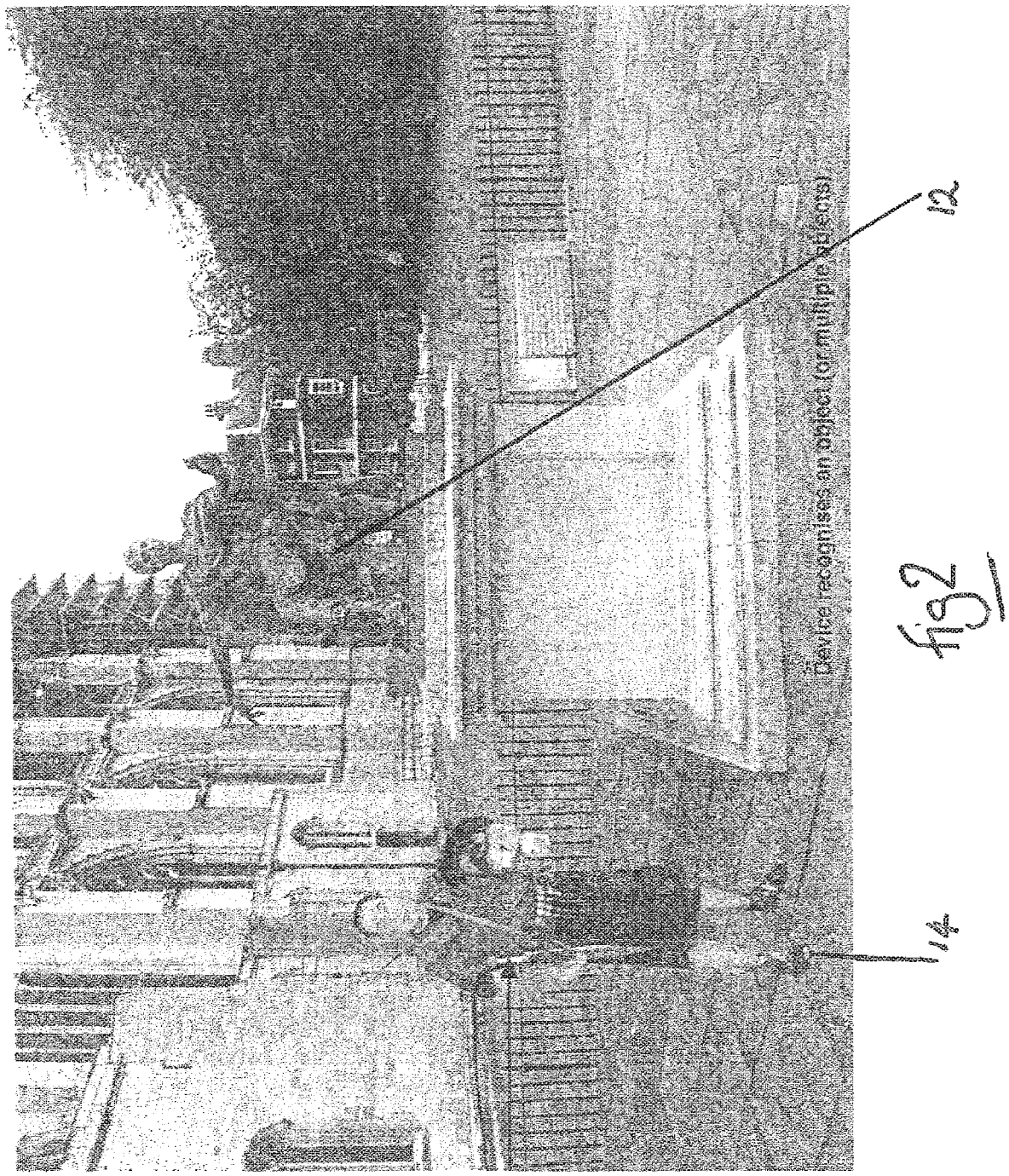
FIG. 2 shows schematically a first step in a context recognition process in accordance with an embodiment of the present invention.

Turning to FIG. 2, this shows the chosen virtual image 14 as it is displayed in the camera view of the device, beside the object 12.

Figure 3:
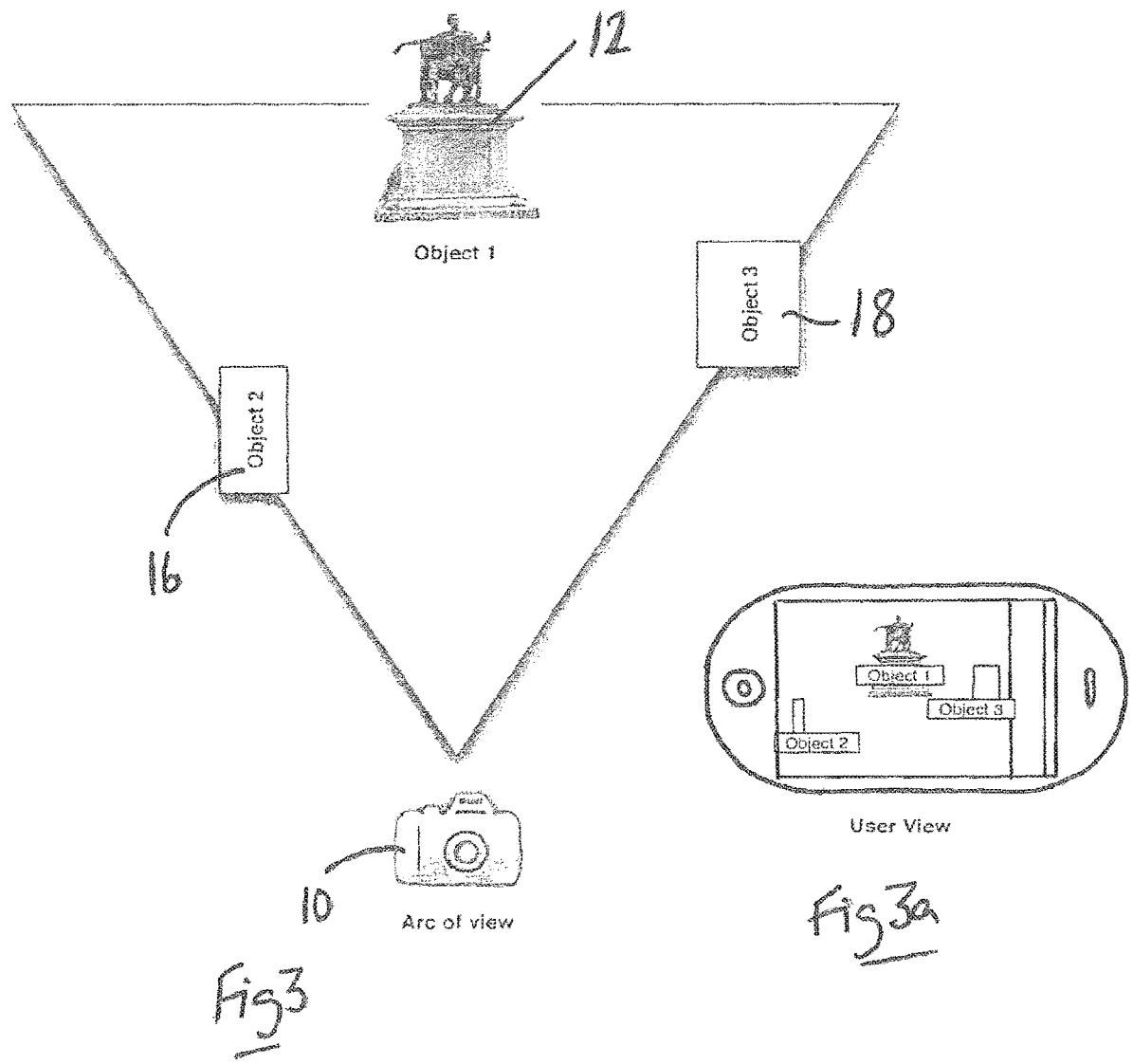

FIG. 3 shows schematically the scenario in which multiple objects are detected by the device. In this case the object 12 is detected and so are two further objects 16 and 18. The device displays all three objects together with respective virtual buttons superimposed thereon so that the user may select the object of interest by touching the appropriate button on the screen, as is shown in FIG. 3a.

Figure 4:
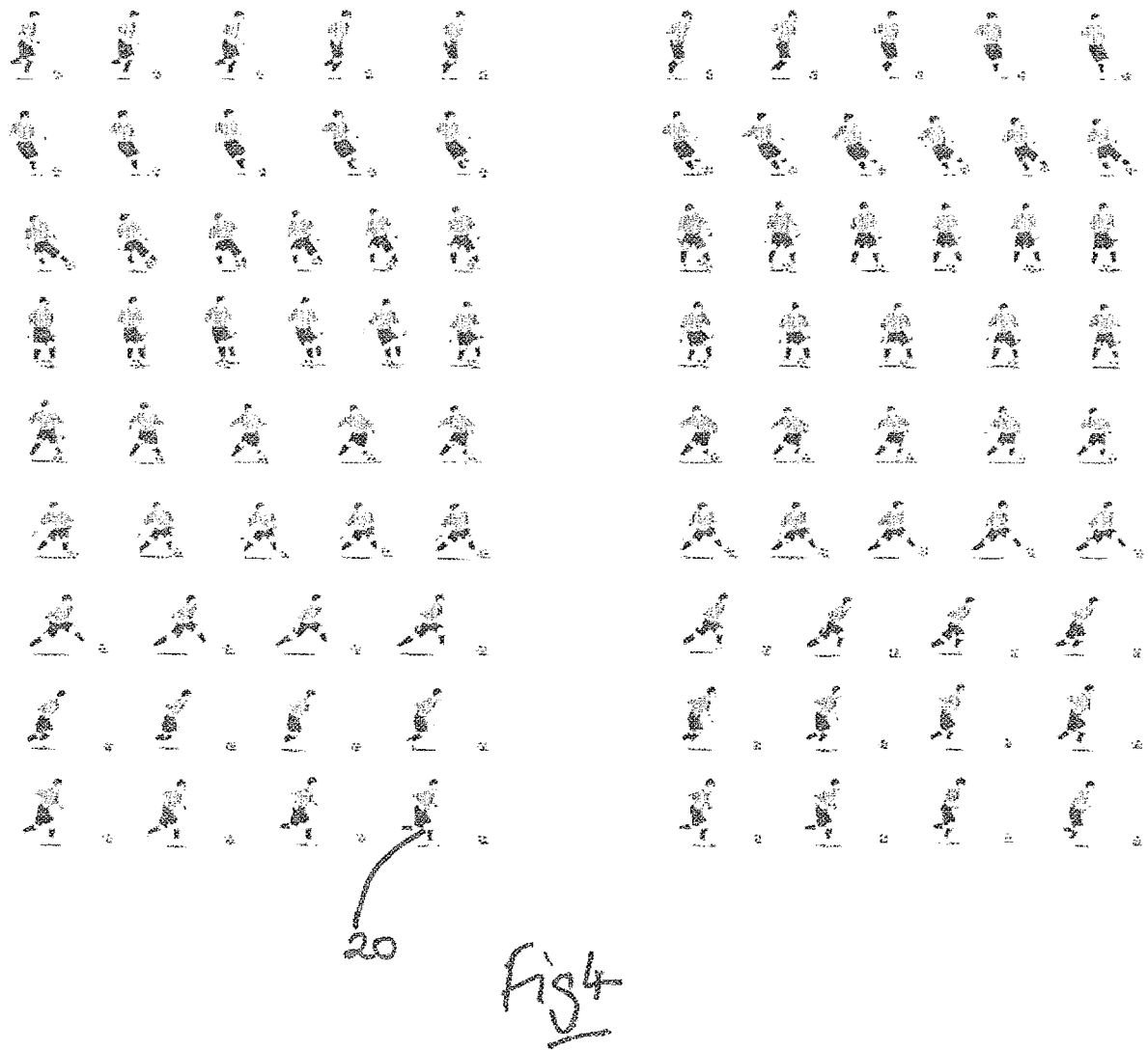
FIG. 4 shows schematically an animation technique for use with an embodiment of the present invention.

FIG. 4 shows schematically one method for animating a virtual image. It uses a long established technique of cutting a moving image into a succession of still frames 20 on a green screen background (not shown). The device then plays back the sequence of still images, removing the green screen background automatically as necessary. As the individual images are replaced at a rate greater than six frames per second, the human eye interprets them as a continuous moving image. A soundtrack, optionally of MP3 format, is played in synchronism with the animation to reinforce the illusion of continuous video footage. In this example the animated figure is a Roman soldier, whose commentary and actions are relevant to the attraction being viewed through the camera display.

Figure 5:
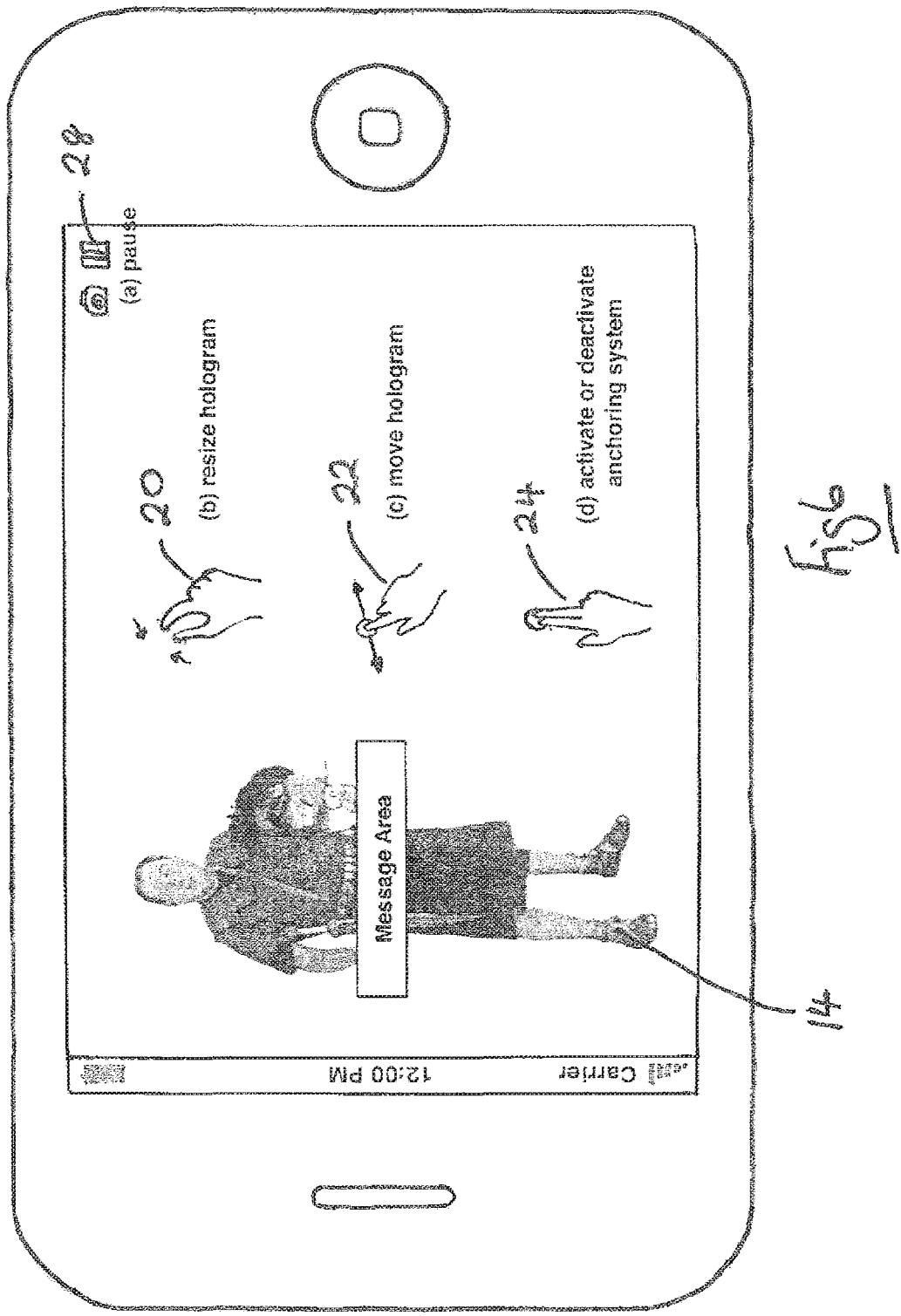
FIG. 5 shows schematically a positioning process according to an embodiment of the present invention.

FIG. 5 shows schematically a technique for positioning the image 14 with respect to the object 12. During creation of a particular app, when the particular scene is first investigated, a creative director will choose an optimum placement for the virtual image, based upon a number of factors, both artistic and practical. Once the optimum position is chosen the system uses trigonometry to compute the position of the image at real world spatial coordinates x, y and z with respect to the object 12. An alternative is to decide upon a zero point within the object and to position the image using absolute x, y and/or z coordinates from the zero point.

FIG. 6 shows schematically how the user can re-size or reposition the image with respect to the object. The image can be resized using a finger and thumb pinching and spreading technique 22 whilst touching the screen. The image can be moved using a drag and drop technique 24, and an anchoring system (described below) can also be activated or deactivated by a double finger double tap technique 26. In a PLAY mode, a virtual PAUSE button 28 is also provided, which converts to a virtual PLAY button (not shown) in PAUSE mode.

In order to maintain the illusion that the figure is actually present beside the attraction, it is necessary that the position of the figure—ie the image 14—be spatially anchored with respect to the object 12. This is because if the user moves whilst viewing the object and the virtual image through the camera, an image that is fixed with respect to the camera screen would quickly fail to maintain the illusion of reality.

FIG. 7 shows schematically an anchoring system according to one embodiment of the present invention. The system uses a pre-defined algorithm to seek objects that are either prominent or else have a definitive shape within the camera view. Once several objects have been located the system uses advanced trigonometric techniques to evaluate the scene displayed in the camera view and to allocate proportion data to the virtual image. The system then locks the image in x, y and z coordinates with respect to its real world context.

FIG. 8 shows schematically in more detail the anchoring system according to the above-described embodiment of the present invention. Firstly, a label 30 indicates that the anchor system has been activated. Then the device dynamically detects the nearest object 32 in the camera view. In this case, the method used is one in which an algorithm seeks to recognise objects by detecting a pattern, rather than using pre-processed matrix points (as per the example of FIG. 1). This allows the algorithm to look for real world objects to which the performance ie the virtual image—can be anchored. For example, the algorithm could recognise the four edges of a snooker table. This allows an improved anchoring technique as recognition rules are created that allow the application of higher or lower thresholds based upon a particular object, or type of object. One suitable previously considered algorithm is known as FAST (Features from Accelerated Segment Test).

A second object 34 is then detected by the device, to provide depth information. The image is then anchored to the first object—ie the position of the image in x, y and z coordinates with respect to the location of the first object 32 is determined. The device then checks regularly to determine whether the object pattern—ie of objects 32 and 34—has changed, which would occur if the user holding the device had moved. If the device determines that there has been movement the device re-scans the field of view and determines the closest match to the initial pattern of objects 32 and 34 to ensure that the position of the virtual image 14 is still true.

The above-described approach allows a user to lock the anchor to a known object within the display, in almost any location, efficiently and invisibly. If there is no specific object from which to take a reference—such as an open field, for example, then the system reverts firstly to a pre-loaded recognition library and then if no view is recognised a digital compass and GPS reference are used to fix the location of the image in real space.

The use of GPS and digital compass bearing by the anchoring system is depicted schematically in FIG. 9. This configuration builds a basic real world map by using GPS coordinates alongside compass bearings. The GPS coordinates are used to lock a known longitude and latitude configuration, whilst the bearings are used to detect 360 degree circular movement by the user. If the system detects such a movement then the movie is returned to its original locked position. The animation returns using algorithms that provide a smooth and quick return to the coordinates acknowledging dampening and speed of return based on distance moved.

The apparent size of the image with respect to objects in the camera view is also important to maintain the illusion of reality. FIG. 10 shows an automatic sizing operation in which the image 14 is adjusted with respect to the object 12 when a user, viewing the object through the camera device, moves either closer to or further away from the object.

Sophisticated algorithms are employed by the device to adjust the size of the image smoothly as the user moves towards or away from the object 12. The autofocus function of the camera lens may be employed to provide data concerning a change in the distance from the object. If the device does not possess an autofocus function then the distance to the recognised object can be calculated using stored data about its origin. Both techniques can be used, where available, to provide a more accurate reading.

Alternatively, the user can manually re-size the image 14 using the pinch technique 22 described earlier.

If a relatively cramped location is detected by the system, such as an indoor location, or a medieval street scene for example, the device automatically re-sizes the image to a larger size so as to maintain realism. FIG. 11 depicts the enlarged image 14 in such a case.

The system also allows the capture of still or video images bearing both the real view and the virtual image. FIGS. 12-15 show schematically a process for taking a photograph with the virtual image 14 included. In FIG. 12 a real person 36 walks into a scene in which the virtual image 14 of the figure is already positioned. In FIG. 13 the photograph is taken and stored and the coordinates of the virtual image are recorded. In FIG. 14 the system post-processes the image 14 and the perspective is auto-detected. The composite image is then re-saved. At FIG. 15 the user is invited to share the stored composite image via virtual buttons 38 accessing several common media. A short video sequence can be recorded and shared in a similar way.

FIG. 16 shows schematically an example of a complete process according to the embodiment described above.

At step 100 the process begins. At step 102 object recognition rules are read from a database. At step 104 the device reads the view and at step 106 it checks for a recognisable pattern. The device loops until a pattern is detected. Once a pattern is detected an appropriate moving image is selected from a library at step 108. At step 110 the image is positioned and play begins. Step 112 awaits a user input. Options to exit 114, re-size 116, anchor 118 or reposition 120 are available. If the user selects to exit the app at step 114 the app is stopped at step 122. Otherwise the video image continues to play at step 124.

FIG. 17 shows an alternative embodiment in which an object recognition database 40 is split into several smaller databases 42, 44, 46, 48 according to user location. Three or more angles of an object are checked 50 and once the object has been detected the virtual image is launched 52.

The above examples describe using touch controls, which may be different to the ones described. However, where the apparatus supports it, non-contact gestures may be employed to control the device. Similarly, where the apparatus supports it, voice commands may be used to control the apparatus.

The contextual information may be derived from a "real world" image, as viewed through the camera of the device, or may be derived from a two-dimensional image, such as a printed page, photograph or electronically displayed image. This allows the techniques described above to be used to enhance a user experience in a wide variety of circumstances, such as viewing a printed publication or advertisement. In one embodiment (not shown), the virtual image can be made to appear to rise or "pop" up from a such a two dimensional context.

Image processing techniques may be employed to create virtual shadows for the virtual image, so as to enhance the perception that the virtual image is a real one. Similarly, image processing techniques may be employed to balance the apparent brightness of the virtual image relative to the real world context being viewed through the device.

Although the examples described above are of a two-dimensional viewing experience, the techniques described herein may also be applied to an apparent three-dimensional viewing experience where the apparatus supports this, such as in 3-D video playback formats.

In the above description, the term "virtual image" is intended to refer to a previously captured or separately acquired image—which is preferably a moving image—that is displayed on a display of the device whilst the user views the real, or current, image or images being captured by the camera of the device. The virtual image is itself a real one, from a different reality, that is effectively cut out from that other reality and transplanted into another one—the one that the viewer sees in the display of his device.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. An apparatus for displaying an augmented reality on a display of a device having a camera, the apparatus comprising:
    a context identification unit for identifying a context video image captured by the camera;
    a virtual image retrieval unit for selecting and displaying a virtual image in the display; and
    a virtual image positioning unit for positioning the virtual image in the display,
    wherein the apparatus is arranged to display the virtual image comprising content from an electronically captured, real world video image from a different reality including a subject, that is cut out and taken from the real world video image of the different reality and transplanted into the video captured by the camera, whilst a user views on the display the video captured by the camera,
    wherein the positioning of the virtual image by the positioning unit includes anchoring the virtual image, and sizing the virtual image, in real time with respect to the context video image as it is being captured, to create the illusion that the subject is present in the field of view of the camera in real time, in the display,
    wherein the display supports a 3-D video playback format and the virtual image is displayed in 3-D to provide a user with an apparent 3-D viewing experience, and
    wherein to anchor the virtual image with respect to a first pattern detected in the context video image, the positioning unit is configured to:
    detect a first object pattern and a second object pattern within the context video image;
    anchor the virtual image to the first object pattern;
    determine whether the first object pattern and the second object pattern have changed in the display; and
    determine whether to adjust the virtual image.

2. The apparatus according to claim 1, wherein the virtual image comprises a sequence of still images taken from a moving video.

3. The apparatus according to claim 1, wherein the virtual image comprises a continuous moving video image.

4. The apparatus according to claim 1, wherein the virtual image comprises an image of a person, creature or other real-world object or article.

5. The apparatus according to claim 1, wherein the context identification unit is arranged in use to identify a context by comparing at least one object in a field of view with stored data from a plurality of objects.

6. The apparatus according to claim 1, wherein the image retrieval unit is arranged in use to select an image from a plurality of stored images according to context information determined by the context identification unit.

7. The apparatus according to claim 1, wherein the device is a hand-held device.

8. The apparatus according to claim 1, wherein the at least one context video image comprises an image of a real-world object captured by the camera.

9. The apparatus according to claim 1, wherein the at least one context video image is derived from a two-dimensional image.

10. The apparatus according to claim 1, wherein the virtual image is arranged to be re-sizable in response to human interaction with the display.

11. The apparatus according to claim 1, wherein the virtual image is arranged to be re-sizable in response to user-input using a finger and thumb technique.

12. The apparatus according to claim 1, wherein the virtual image is that of a human figure.

13. The apparatus according to claim 1, wherein the positioning unit is responsive to a drag and drop interaction by a user touching the display to re-position the virtual image within the display.

14. A method of displaying an augmented reality on a display of a device having a camera, the method comprising:
    identifying a context video image captured by the camera; and
    selecting, positioning, and displaying a virtual image on the display,
    wherein the virtual image comprises an electronically captured, real world video image from a different reality including a subject, that is cut out and taken from the real world video image of the different reality and transplanted into the video captured by the camera, whilst a user views on the display the video captured by the camera,
    wherein the positioning of the virtual image includes anchoring the virtual image and sizing the virtual image, in real time with respect to the context video image as it is being captured, to create the illusion that the subject is present in the field of view of the camera in real time in the display,
    wherein the display supports a 3-D video playback format and the virtual image is displayed in 3-D to provide a user with an apparent 3-D viewing experience, and
    wherein the virtual image is anchored with respect to a first pattern detected in the context video image comprising:
    detecting a first object pattern and a second object pattern within the context video image;
    anchoring the virtual image to the first object pattern;
    determining whether the first object pattern and the second object pattern have changed in the display; and
    determining whether to adjust the virtual image.

15. The method according to claim 14, wherein the virtual image comprises sequence of still images taken from a moving video.

16. The method according to claim 14, wherein identifying the first pattern comprises comparing at least one object in the field of view with stored data from a plurality of objects.

17. The method according to claim 14, wherein the virtual image is selected from a plurality of stored images according to determined context information.

18. The method according to claim 14, wherein the virtual image is displayed on the display of a hand-held device.

19. The method according to claim 14, wherein the context image comprises an image of a real-world object captured by the camera.

20. The method according to claim 14, wherein the at least one context video image is derived from a two-dimensional image.

21. The method according to claim 14, further comprising resizing the virtual image by human interaction with the display.

22. The method according to claim 14, further comprising re-sizing the virtual image using a finger and thumb technique.

23. The method according to claim 14, wherein the virtual image is that of a human figure.

24. The method according to claim 14, wherein the virtual image is re-positioned within the display by a drag and drop user-interaction with the display.

\* \* \* \* \*